C. F. MURRAY.
REINFORCEMENT FOR PNEUMATIC TIRES AND METHOD OF FORMING SAME.
APPLICATION FILED JULY 2, 1908.

949,156. Patented Feb. 15, 1910.

Witnesses
W. X. Ford
C. J. Belknap

Inventor
Charles F. Murray
By Whitmore, Hulbert & Whitmore
Attys

UNITED STATES PATENT OFFICE.

CHARLES F. MURRAY, OF DETROIT, MICHIGAN.

REINFORCEMENT FOR PNEUMATIC TIRES AND METHOD OF FORMING SAME.

949,156. Specification of Letters Patent. Patented Feb. 15, 1910.

Application filed July 2, 1908. Serial No. 441,655.

*To all whom it may concern:*

Be it known that I, CHARLES F. MURRAY, a citizen of the United States of America, residing at Detroit, in the county of Wayne and State of Michigan, have invented certain new and useful Improvements in Reinforcements for Pneumatic Tires and Methods of Forming Same, of which the following is a specification, reference being had therein to the accompanying drawings.

The invention relates generally to pneumatic tires for vehicles, and particularly to a reinforcement therefor acting to prevent puncture of the tire and at the same time having substantially the same pliability and resiliency as the tube.

The invention consists in the construction of the reinforcement and in the method or process of forming the same, as will be more fully hereinafter pointed out.

Figure 1:
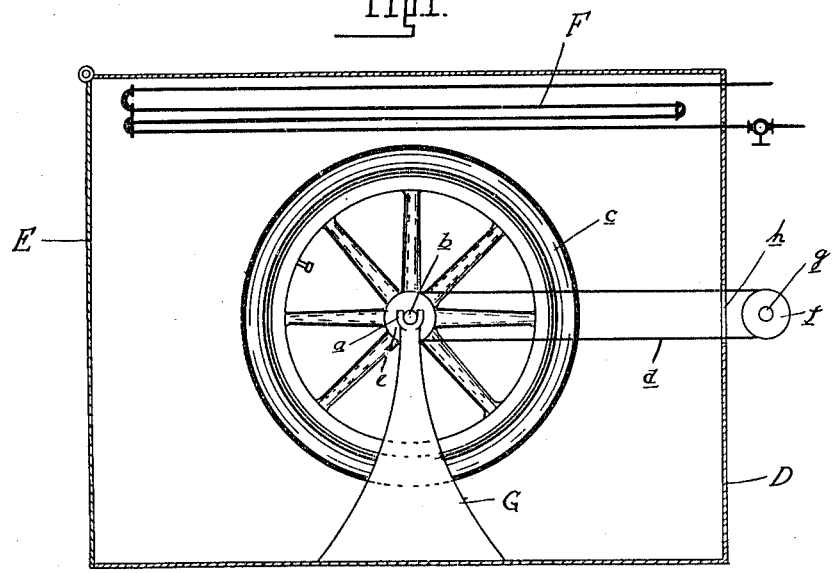
Figure 2:
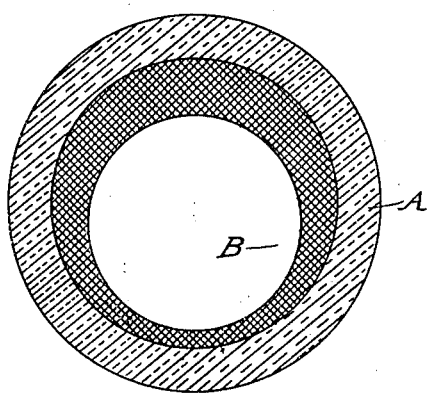

In the drawings illustrating my invention,—Figure 1 is a sectional view through suitable apparatus for carrying out the method; and Fig. 2 is a cross section through a pneumatic tire, with the lining applied.

A represents a vehicle tire of any ordinary construction, in this instance a single tube, and B is the reinforcement, preferably in the form of a lining extending as shown entirely about the interior of the tire, and having a relatively thick section adjoining the tread acting to reinforce the latter and prevent puncture.

The compound of which the lining is composed is characterized by being elastic and pliable and forms the subject-matter of another and pending application. It consists primarily of a deliquescent salt, such as magnesium chlorid, and starch, or other equivalent substance. The magnesium chlorid in solution is mixed preferably with a corresponding amount by weight of ordinary starch, the mixture having the consistency of thick cream.

The tire to be reinforced is first deflated and partially filled with the mixture described. The tire is then inflated, the compound distributed therein preferably over the entire inner surface with a maximum amount in the tread to form a lining, and in practice is simultaneously solidified, forming the desired reinforcement.

To effect the solidification, the compound is subjected to heat at a temperature ranging from 212 to 220 degrees Fahrenheit, and for a period ranging from one to two and one-half hours. During the operation of cooking or heating, the tire is slowly revolved, so that the reinforcing material will be properly distributed within the interior of the tube, with the maximum portion adhering to the tread section for the purpose previously set forth. After the solidification has been effected, the tire is deflated and in readiness for use, storage or shipment.

Any suitable apparatus may be employed for carrying out the steps of the method set forth above. I preferably use a heater or oven, as D, in the form of a closed casing having a hinged door E, and provided interiorly with a suitable radiator F.

G are standards within the casing, having forked upper ends a, to which are detachably journaled the shaft b, carrying a wheel c, constituting a suitable form on which the tire is mounted.

The wheel is slowly rotated during the operation of heating by any suitable drive mechanism, such as a belt d, a pulley e fixed to the shaft b, and a drive pulley f upon a suitable driven shaft g, the driving means extending outside the casing through a suitable slot or opening h.

The reinforcement, by reason of the material of which it is formed, adheres to the tire, and is thus held in its proper position under all conditions in use. The rotation of the forming wheel carrying the tire causes a relatively large amount of the lining material to adhere to the tread portion of the tube, thereby producing a relatively thick section of the lining at the desired point.

A reinforcement or lining of the character described is superior in many respects to a solid filling or core, as while practically performing the same function so far as a tread reinforcement is concerned it is considerably lighter than the solid filling and less expensive. Further, as will be obvious, any ordinary tire may be detached from its wheel and reinforced, which allows the lining to be effected at a central point and the tire returned to the user to be applied to the vehicle wheel.

What I claim as my invention is,—

1. The herein-described method of reinforcing pneumatic tires, consisting in injecting within the pneumatic tube elastic fluid material, then inflating the partially filled tire, rotating the tire to distribute the fluid material over the inner surface of the tread section, and heating the tire while rotating to solidify the fluid material.

2. The herein-described method of lining pneumatic tires, consisting in partially filling a pneumatic tube with a deliquescent salt and starch in fluid form, distributing the fluid over the tire tread, and solidifying the fluid by cooking.

3. The herein-described method of lining pneumatic tires, consisting in partially filling a pneumatic tube with a deliquescent salt and starch in fluid form, in then inflating the tube, subsequently rotating the latter to effect a distribution of the fluid about the tread section of the tire and subjecting the fluid to the action of heat during the rotation of the tire.

4. The herein-described method of reinforcing pneumatic tires, consisting in partially filling the tire with an elastic fluid material, rotating the tire to distribute the material over the tread section, and solidifying the material by heat.

In testimony whereof I affix my signature in presence of two witnesses.

CHARLES F. MURRAY.

Witnesses:
NELLIE KINSELLA,
HARRY W. GALVIN.